United States Patent
Bruck et al.

(10) Patent No.: US 9,915,276 B2
(45) Date of Patent: Mar. 13, 2018

(54) VALVE, IN PARTICULAR PILOT-OPERATED PROPORTIONAL PRESSURE CONTROL VALVE

(71) Applicant: Hydac Fluidtechnik GmbH, Sulzbach/Saar (DE)

(72) Inventors: Peter Bruck, Althornbach (DE); Philipp Hilzendegen, Weiskirchen (DE); Gerd Schneider, Dillingen (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 112 days.

(21) Appl. No.: 13/784,934

(22) Filed: Mar. 5, 2013

(65) Prior Publication Data

US 2013/0255809 A1   Oct. 3, 2013

(30) Foreign Application Priority Data

Mar. 30, 2012 (DE) .................. 10 2012 006 681

(51) Int. Cl.
*F15B 13/043* (2006.01)
*F15B 13/04* (2006.01)
(Continued)

(52) U.S. Cl.
CPC ...... *F15B 13/0401* (2013.01); *F15B 13/0433* (2013.01); *F15B 13/0435* (2013.01); *F16K 17/10* (2013.01); *F16K 27/048* (2013.01); *F16K 31/0613* (2013.01); *F16K 31/426* (2013.01); *G05D 16/2093* (2013.01); (Continued)

(58) Field of Classification Search
CPC .............. F15B 13/0402; F15B 13/0433; F15B 13/0401; F15B 13/0435; F15B 13/042; G05D 16/2093; F16K 27/048; F16K 31/426; F16K 31/0613; F16K 17/10; F16H 2061/0258; F16H 61/0251; Y10T 137/87193; Y10T 137/86614; Y10T 137/86702; Y10T 137/86582
USPC ............ 137/596.14, 625.64, 625.68; 91/446, 91/454; 251/30.01–30.05
See application file for complete search history.

(56) References Cited

U.S. PATENT DOCUMENTS 4,301,715 A * 11/1981 Acar ............... F16K 11/044
137/596.17
4,305,566 A * 12/1981 Grawunde ........... F16K 31/406
137/491

(Continued)

FOREIGN PATENT DOCUMENTS

DE  11 2007 001 456 T5   4/2009
WO  WO 2010085991 A2 *  8/2010 .......... F15B 13/0433

*Primary Examiner* — Craig J Price
(74) *Attorney, Agent, or Firm* — Wenderoth, Lind & Ponack, L.L.P.

(57) ABSTRACT

A valve, in particular a pilot-operated proportional pressure control valve, has a valve housing (5) with a pressure supply port (7), a working port (9), and a drain port (11). In the valve housing (5), a main valve piston (15) can be moved by a pilot stage (13) for control of the fluid flow between the pressure supply port (7) and the working port (9). The pilot stage (13) has a valve closing element (43) for a pilot chamber (41). The valve closing element (43) is movable from an open position (OS) into a closed position (SS) by an actuating apparatus (45). The valve closing element (43) can actuate a leakage reduction stage (53).

16 Claims, 4 Drawing Sheets

(51) Int. Cl.
 *G05D 16/20* (2006.01)
 *F16K 17/10* (2006.01)
 *F16K 31/42* (2006.01)
 *F16K 31/06* (2006.01)
 *F16K 27/04* (2006.01)
 *F16H 61/02* (2006.01)

(52) U.S. Cl.
 CPC ............... *F16H 2061/0258* (2013.01); *Y10T 137/86582* (2015.04); *Y10T 137/86614* (2015.04)

(56) References Cited

U.S. PATENT DOCUMENTS

| | | | | |
|---|---|---|---|---|
| 4,553,732 | A | * | 11/1985 | Brundage ............... F16K 17/02 251/30.01 |
| 4,741,364 | A | * | 5/1988 | Stoss et al. ............. 137/625.64 |
| 4,964,611 | A | * | 10/1990 | Andersson ................ 251/30.02 |
| 5,031,663 | A | * | 7/1991 | Fukuta et al. ........... 137/625.64 |
| 5,836,335 | A | * | 11/1998 | Harms et al. ............ 137/625.64 |
| 5,894,860 | A | * | 4/1999 | Baldauf et al. .......... 137/625.65 |
| 6,378,557 | B2 | * | 4/2002 | Kawamura et al. ..... 137/625.64 |
| 8,662,109 | B2 | * | 3/2014 | Bill ..................... F15B 13/0433 137/625.64 |
| 8,757,208 | B2 | * | 6/2014 | Dornbach et al. ....... 137/625.64 |
| 2008/0017261 | A1 | | 1/2008 | Harms et al. |
| 2009/0212244 | A1 | * | 8/2009 | Pfaff et al. ................ 251/30.03 |

* cited by examiner

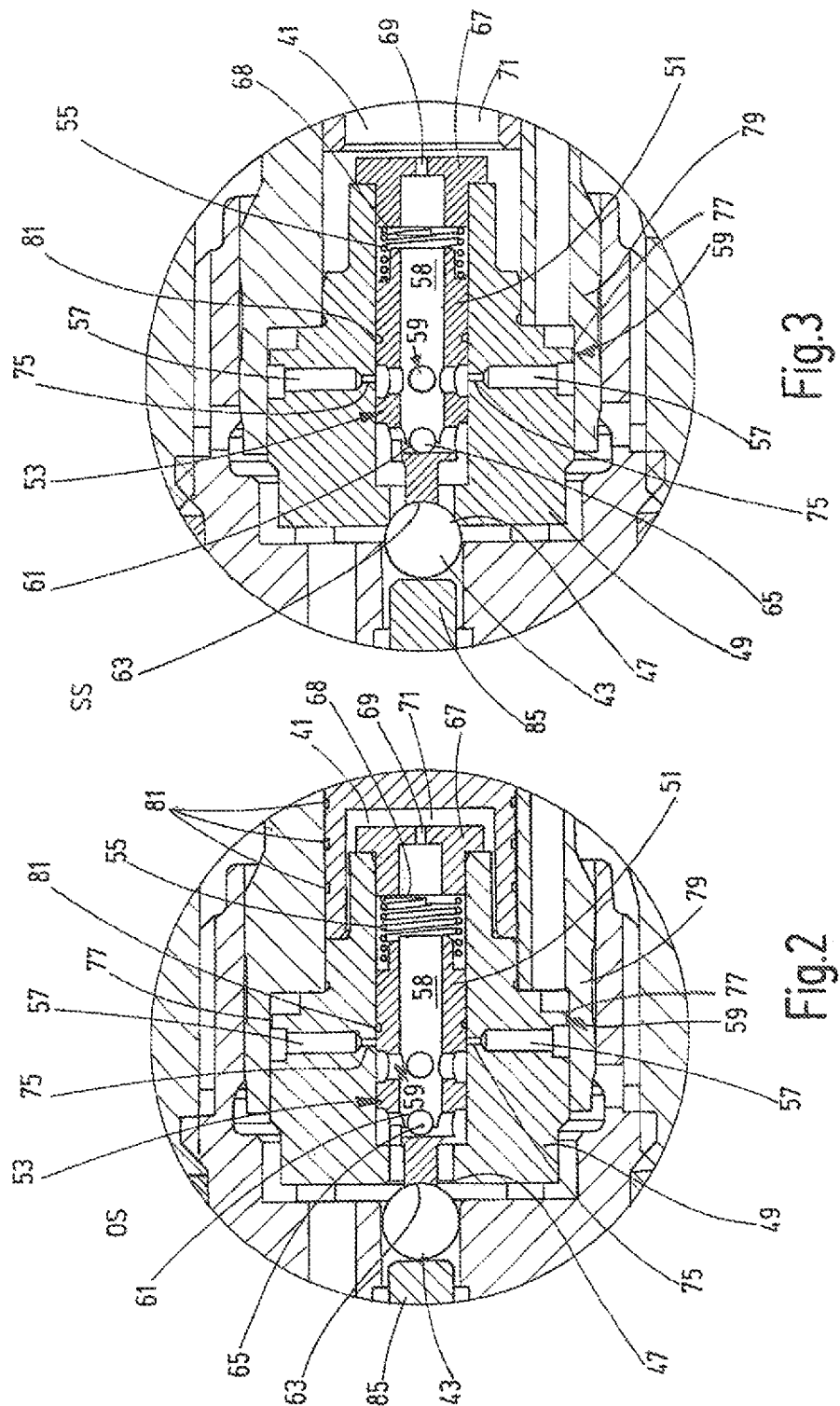

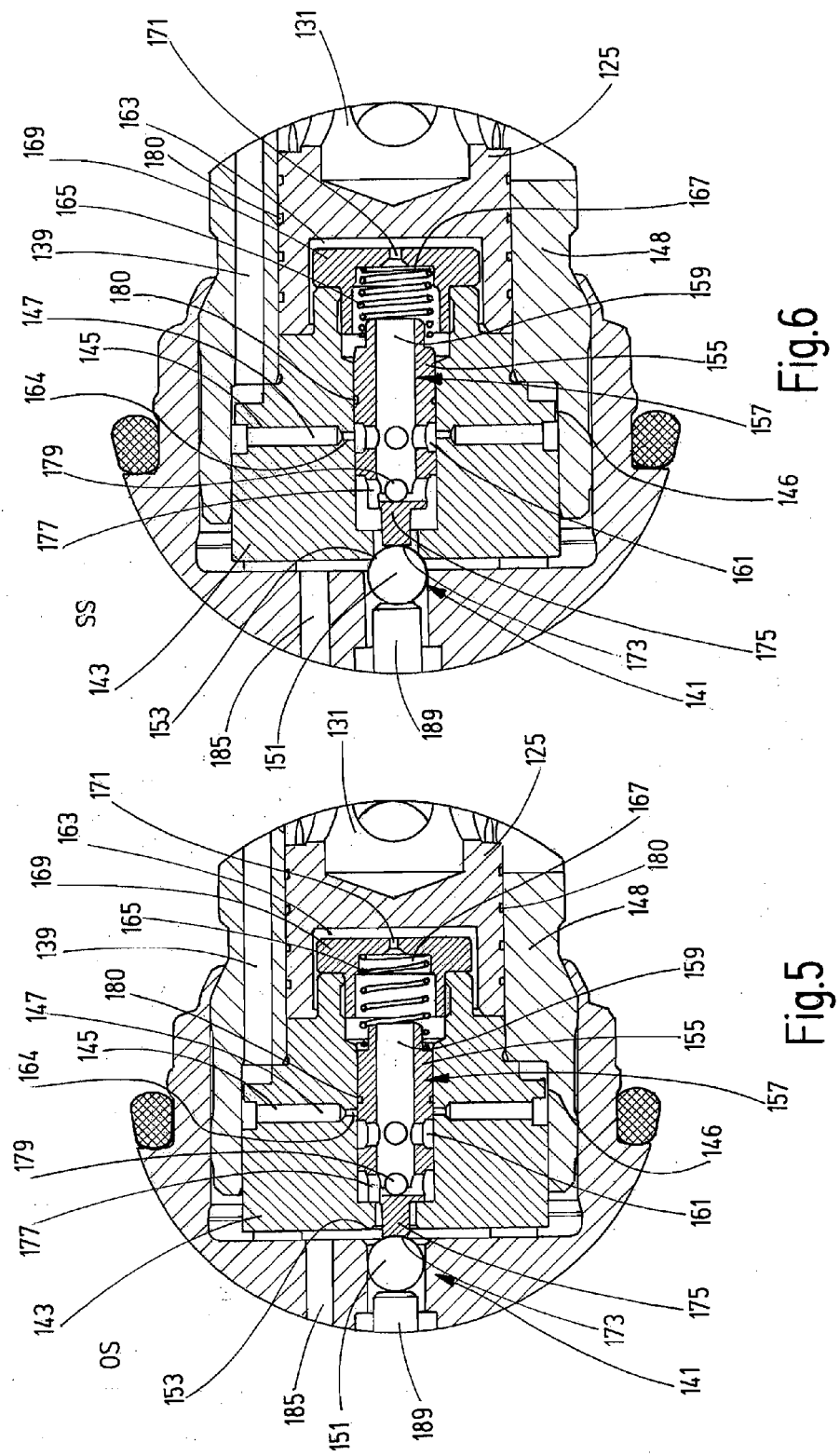

VALVE, IN PARTICULAR PILOT-OPERATED PROPORTIONAL PRESSURE CONTROL VALVE

FIELD OF THE INVENTION

The invention relates to a valve, in particular a pilot-operated proportional pressure control valve, with a valve housing that has a pressure supply port, a working port, and a drain port. In the valve housing, a main valve piston can be moved by a pilot stage for control of the fluid flow between the pressure supply port and the working port. The pilot stage has a valve closing element for a pilot chamber. The valve closing element is movable from an open position into a closed position by an actuating apparatus.

BACKGROUND OF THE INVENTION

Pilot-operated proportional pressure control valves are disclosed in the prior art, for example, by US 2008/0017261 A1. They are used, for example, in mobile machinery for electrodynamic actuation of clutches. In the actuation of these clutches, a critical requirement is that the valves in the off state must produce a pressure of exactly zero bar (0 bar), so that the assigned clutch can reliably disengage. However, the valves that meet this requirement have a certain serious disadvantage. The pilot oil flow that flows unused to the drain port is extremely large. Often the pilot oil flow reaches one liter per minute (1 l/min). The pilot oil also drains unused to the drain port in the neutral position of the valve. In technical terms, the unused drainage of pilot oil is also referred to as leakage.

In complex gear applications in which a large number of these valves is often needed, the energy loss, which can be in the kilowatt range in the extreme case, is considerable.

This leakage is even more serious in applications in which the clutch valves are supplied using a hydraulic accumulator. The high leakage then necessitates frequent recharging of the hydraulic accumulator.

SUMMARY OF THE INVENTION

An object of the invention is to provide an improved valve that exhibits leakage reduced to the necessary amount.

This object is basically achieved by a valve having a valve closing element that can actuate a leakage reduction stage. The valve then has not only a pilot valve, referred to as a pilot stage, but, in addition as part of the pilot valve, has a leakage reduction valve referred to as a leakage reduction stage in this application. The leakage reduction stage is coupled to the valve closing element of the pilot stage. When the valve closing element is moved by the actuating apparatus, the leakage reduction stage, which is coupled to the valve closing element, is actuated in the direction of an open position. The leakage reduction stage then interrupts the pilot oil flow only when the valve is unactuated. The leakage reduction stage thus reduces the leakage by about 90% in the neutral position of the valve without adversely affecting the remaining functionality of the valve. The energy loss is therefore minimized. In a valve that is supplied by a hydraulic accumulator, the accumulator recharging cycles are prolonged several-fold.

The leakage reduction stage especially advantageously has a leakage piston that is coupled to the valve closing element for controlling the fluid flow between the pressure supply port and the pilot chamber. By moving the leakage valve piston into a blocking position, the fluid flow of the pilot oil to the pilot chamber and from there to the drain port is stopped when the valve is in the unactuated neutral position.

In this case, the valve closing element and the leakage piston can also be made in one piece. Thus, the pilot chamber is alternately connected to the pressure supply port or the drain port. This configuration ensures that the amount of pilot oil is reduced to the minimum that is necessary for actuating the pilot stage.

Advantageously, the leakage piston establishes a fluid inlet connection between the pressure supply port and the pilot chamber only in the closed position of the valve closing element. Therefore, pilot oil is ensured to flow into the pilot chamber only when a pressure for actuating the main valve piston is to be built up in the pilot chamber.

A reset spring advantageously acts on the leakage piston against the actuating apparatus. The reset spring interrupts the fluid connection between the pressure supply port and the pilot chamber when the actuating apparatus is inactive. The reset spring then also presses the valve closing element out of its pilot seat so that the pilot oil that is under high pressure can drain out of the pilot chamber to the drain port.

According to another embodiment, the leakage piston has a fluid drain channel for passage of fluid from the pilot chamber to the drain port. Therefore, the inflow as well as the outflow of pilot oil to the pilot chamber run via the leakage piston.

The leakage reduction stage is especially advantageously located in the valve housing between the valve closing element and the main valve piston. In this way, the available space in the valve housing can be optimally used.

The leakage reduction stage is preferably located in an intermediate housing. The use of an intermediate housing greatly facilitates the mounting of the valve. The leakage reduction stage can be located as a unit in the intermediate housing before the valve is completely assembled. This configuration permits producing valves with and without a leakage reduction stage in one production line.

The intermediate housing can have an axial bore for accommodating the leakage piston and its reset spring. Preferably, on the end side on the intermediate housing, a retainer is located for the leakage piston and the reset spring. The retainer can be made especially in the form of a closure part with a fluid channel. Thus, the leakage piston is arranged to be axially movable in the axial bore. A reset spring acts on the leakage piston in the direction of its respective blocking position. The reset spring is kept in the intermediate housing by the retainer. Because the closure part has a fluid channel, pilot oil within the pilot chamber can flow from the axial bore to one end surface of the main valve piston and can apply pressure to the main valve piston so that the main valve piston moves in the direction of its respective operating position.

There are several possibilities for forming the retainer. The reset spring can make contact with one end surface of the retainer or can be accommodated in a recess of the retainer. The latter development entails a shortening of the required space.

Advantageously, a fluid inlet connection between at least one transverse bore in the intermediate housing and the axial bore can be cleared by the leakage piston. Thus, the pilot oil can be routed from the pressure supply port through the transverse bore in the intermediate housing and through the leakage piston into the pilot chamber.

To advantageously further reduce the pilot oil flow, a fluid guide is between the pressure supply port and the leakage reduction stage. The fluid guide is preferably formed by an annular gap between a valve housing part and the intermediate housing. Moreover, this fluid guide has a filter function. Particles in the pilot oil that are larger than the annular gap are captured and cannot easily penetrate into the pilot stage.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 2 is a partial, side elevational view in section of a detail of the valve of FIG. 1, with the actuating apparatus being inactive;

FIG. 3 is a partial, side elevational view in section of a detail of the valve of FIG. 1, with the actuating apparatus being active;

FIG. 5 is a partial, side elevational view in section of a detail of the valve of FIG. 4, with the actuating apparatus being inactive; and FIG. 6 is a partial, side elevational view in section of a detail of the valve of FIG. 4, with the actuating apparatus being active.

DETAILED DESCRIPTION OF THE INVENTION

Figure 1:
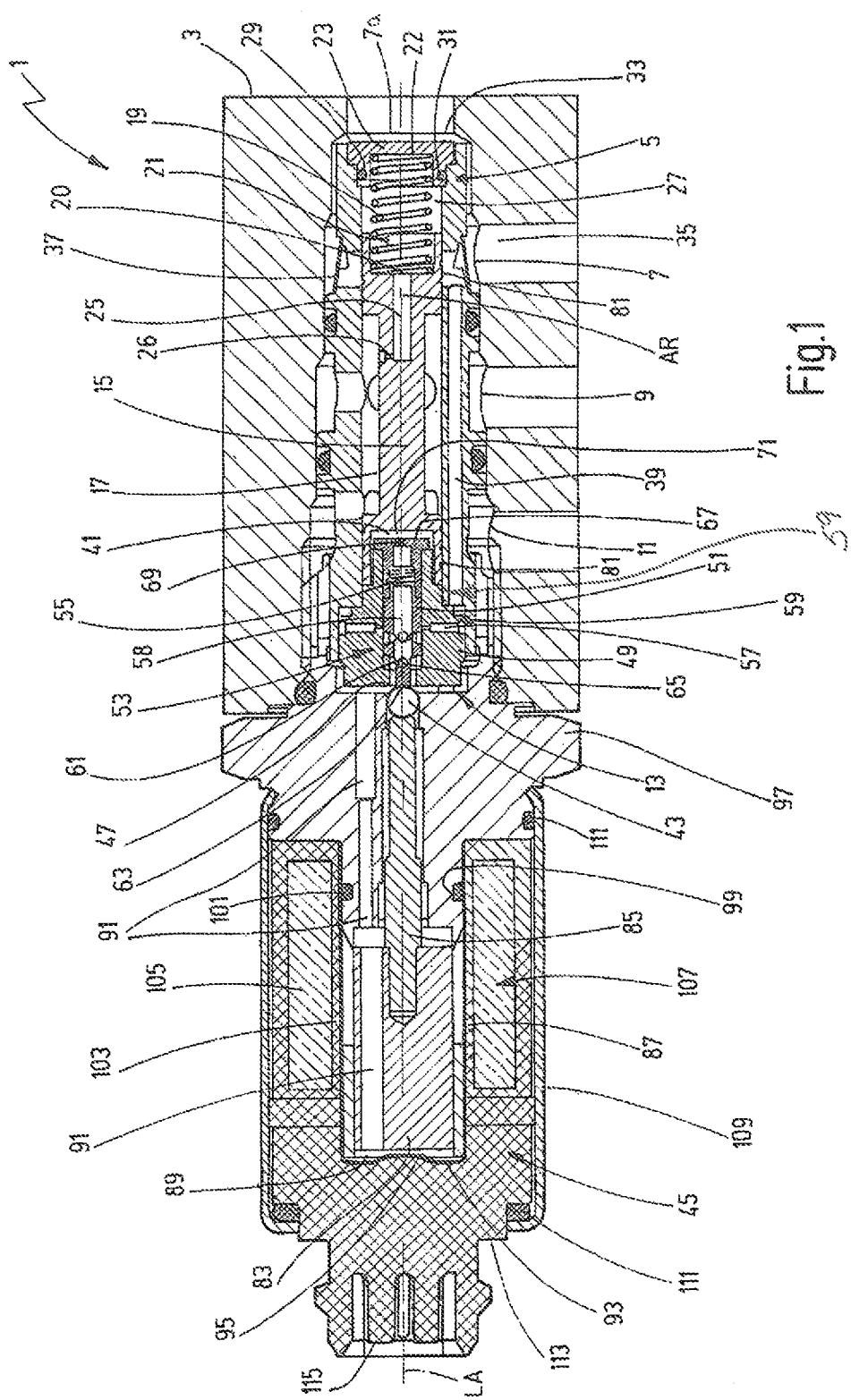
FIG. 1 is a side elevational view in section of a valve according to a first exemplary embodiment of the invention.

FIG. 1 shows a valve 1 according to the invention, in particular a pilot-operated proportional pressure control valve in a state installed in a valve block 3. The valve 1 is made as a cartridge valve and has a valve housing 5 with a pressure supply port 7, a working port 9, and a drain port 11.

In the valve housing 5, a main valve piston 15 can be moved axially by a pilot stage 13, among other things for controlling the fluid flow between the pressure supply port 7 and the working port 9. The main valve piston 15 for this purpose has a peripheral groove 17 whose length in the axial direction AR of the main valve piston 15 is dimensioned such that a connection is alternately produced between the working port 9 and the pressure supply port 7 or the drain port 11. The fluid flow can therefore be continuously controlled from the pressure supply port 7 to the working port 9 and from the working port 9 to the drain port 11. A main reset spring 19 acts on the main valve piston 15 in the direction of a neutral position shown in FIG. 1 establishing a fluid connection between the working port 9 and the drain port 11. The main reset spring 19 has one end 20 engaging an end-side recess 21 of the main valve piston 15 and an opposite end 22 kept in the valve housing 5 by a screw 23. The main valve piston 15 is balanced on the side with the main reset spring 19. In the main valve piston 15, a pressure relief bore 25 with a throttling site connects the peripheral groove 17 to a chamber 27 in which the main reset spring 19 is located to conduct fluid. The end-side screw 23 has a peripheral groove 29 for accommodating an O-ring 31 for sealing of the chamber 27 to the outside.

The pressure supply port 7a, 17 is provided either on the valve bottom 33 or, according to the solution as shown in FIG. 1, in a lateral port 35 of the valve block 3, discharging in the vicinity of the valve bottom 33, respectively. Oil flowing into the valve 1 is filtered by a peripheral-side conical sieve 37 that covers the pressure supply port 7.

The movement of the main piston 15 is controlled by the pilot stage 13. In the valve housing 5, a fluid channel 39 is offset radially relative to the longitudinal axis LA of the valve 1 for passage of pilot oil from the pressure supply port 7 to a pilot chamber 41 of the pilot stage 13. The pilot stage 13 comprises a valve closing element 43 in the form of a ball for closing the pilot chamber 41. The valve closing element 43 can be moved for this purpose by an actuating apparatus 45 from an open position OS (FIG. 2) into a closed position SS (FIG. 3). If the valve closing element 43 is moved by the actuating apparatus 45, valve closing element 43 is pressed against a valve seat 47 in an intermediate housing 49 of the valve housing 5. The fluid connection from the pilot chamber 41 to the drain port 11 is then interrupted.

At the same time, the valve closing element 43 acts on a leakage piston 51 of a leakage reduction stage 53 against the action of a reset spring 55 in the intermediate housing 49. Both the leakage piston 51 and the reset spring 55 are located in an axial bore 58 of the intermediate housing 49. In the actuated state of the valve closing element 43. a fluid connection between the transverse bores 57 and the axial bore 58 in the intermediate housing 49 is opened by the leakage piston 51. Pilot oil can then flow from the pressure supply port 7 via a fluid inlet connection 59 into the pilot chamber 41 and can act on the main valve piston 15 on the end side.

This fluid inlet connection 59 is formed by channel 39, an annular gap 77 between the outer periphery of the intermediate housing 49 and the inner periphery of the valve housing 5 (valve housing part 79 in FIG. 2) in the region of the fluid transition between the fluid channel 39, the transverse bores 57 in the intermediate housing 49, transverse bores 65 in the leakage piston 57, axial bore 58 in intermediate housing 49 and fluid channel 69 in closure part 61. The valve closing element 43 is no longer pressed by the actuating apparatus 45 into the valve seat 47 when the actuating apparatus 45 is switched to be de-energized. The reset spring 55 then presses the leakage piston 51 from the closed position (FIG. 3) into the open position (FIG. 2) in which the fluid inlet connection 59 is interrupted between the pressure supply port 7 via the transverse bores 57 and the pilot chamber 41, and a fluid drain channel 61 is opened between the pilot chamber 41 and the drain port 11 via the passages at the axial end of intermediate housing 41 adjacent actuating apparatus 45 and in valve housing 5 spaced radially outwardly from intermediate housing 49.

The leakage piston 51 (FIGS. 2, 3) is tapered on the end side 63 that makes contact with the valve closing element 43 and has transverse bores 65 as part of the fluid drain channel 61. The reset spring 55 is held by an end-side retainer 67 in the form of a closure part in the intermediate housing 49 and makes contact with one end surface of the closure part 67. For passage of the pilot oil from the axial bore 58 in the intermediate housing 49 to the main valve piston 15, the closure part 67 is provided with a fluid channel 69 in the form of a throttle that is used to dampen the main valve piston or control piston 15. The main valve piston 15 (FIG. 1) on the end side has a recess 71 engaged by the intermediate housing 49 and the retainer 67. The leakage reduction stage 53 is therefore located in the valve housing 5 between the valve closing element 43 and the main valve piston 15 in the intermediate housing 49 to save space.

The transverse bores 57 of the intermediate housing 49 are tapered in cross section to form pilot orifices 75 (see FIGS. 2, 3). Between the pressure supply port 7 and the transverse bores 57 in the intermediate housing 49, the annular gap 77 is made between the intermediate housing 49 and the valve housing part 79. The small diameter of the annular gap 77 forms a constriction as a fluid guide that is also used as a filter. Particles of the pilot oil which are larger than the annular gap 77 are stopped, so that they cannot penetrate into the pilot stage 13.

The main valve piston 15 and the leakage piston 51 have pressure centering grooves 81 that are circumferential on the peripheral side for purposes of sealing.

The valve 1 is controlled by an electromagnetic actuating apparatus 45. The actuating apparatus 45 has a magnet armature 83 that acts on the valve closing element 43 via a rod-shaped actuating part 85. The magnet armature 83 is guided to be able to move lengthwise in a cup-shaped pressure sleeve 87. A pressure relief bore 91 is between the drain port 11 and an armature space 89 of the magnet armature 83. The pressure relief bore 91 and the armature space 89 are also connected to the drain port 11 via the passages around the intermediate housing 49. The pressure sleeve 87 has a recessed bottom 93 which acts as a stop 95 for the magnet armature 83. The pressure sleeve 87 is slipped onto a pole core 97. The pole core 97 has a peripheral groove 99 with an O-ring 101 for sealing of the armature space 89. A coil body 103 with coil windings 105 is slipped onto the pressure sleeve 87. On the outside, the magnet coil 107 is enclosed by a sleeve 109 that is crimped on the end side and is sealed by two O-ring seals 111. On the free end 113, the actuating apparatus 45 has a plug-and-socket connection 115 for connecting to a control unit and has a current source.

Figure 4:
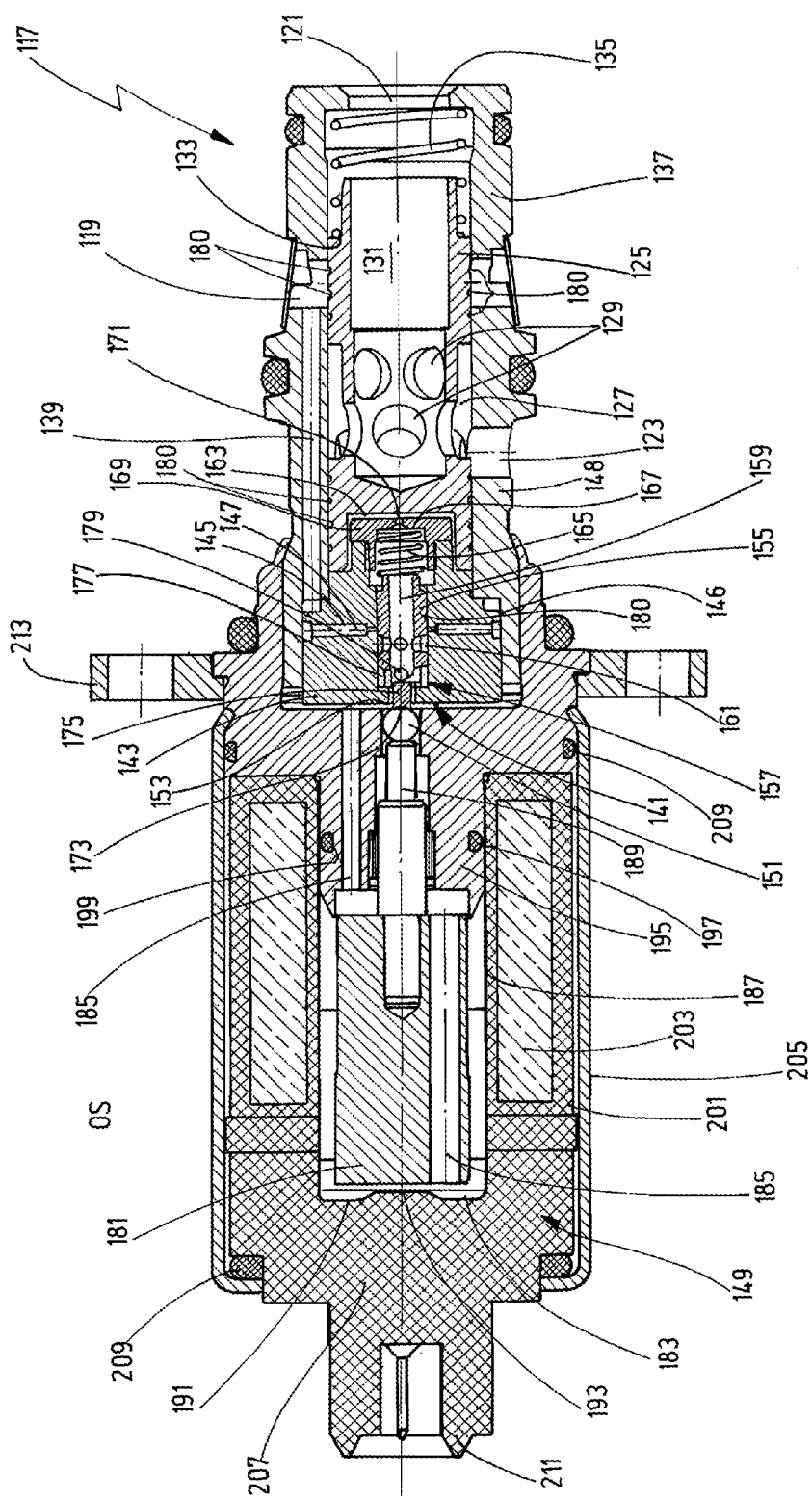
FIG. 4 is a side elevational view in section of a valve according to a second exemplary embodiment of the invention.

The second embodiment of the valve 117, shown in FIGS. 4 to 6, is characterized by a shorter construction. The valve is likewise made as a cartridge valve.

The second embodiment has a pressure supply port 119 in the middle between a bottom-side working port 121 and a drain port 123. The main valve piston 125 has a peripheral groove 127 establishing the fluid connection between the pressure supply port 119 and the drain port 123 in the neutral position of the valve 117. The peripheral groove 127 has bores 129 to an axial blind bore 131 of the main valve piston 125 to establish a fluid connection from the peripheral groove 127 to the working port 121. The main valve piston 125 on the end side has a shoulder 133 engaged by a main reset spring 135 that is held on the end side in the valve housing 137. As a result of the pressure supply port 119 being located in the middle, the length of an axial pilot oil channel 139 in the valve housing 137 is also shortened. The pilot oil channel 139 connects the pressure supply port 119 to a pilot stage 141 located on an intermediate housing 143. Between the axial pilot oil channel 139 and transverse bores 145 in the intermediate housing 143, a fluid guide 146 is made as a constriction. The fluid guide 146 is made as an annular gap between the intermediate housing 143 and a valve housing part 148.

In the pilot stage 141, an actuating apparatus 149 can actuate a valve closing element 151 in the form of a ball and can press it against a valve seat 153 in the intermediate housing 143. The valve closing element 151 actuates a leakage piston 155 of a leakage reduction stage 157 which establishes a connection between the transverse bores 145 in the intermediate housing 143 and an axial bore 159. The leakage piston 155 for this purpose has transverse bores 161 corresponding to the transverse bores 145 in the intermediate housing 143. The pilot oil can then be passed through the intermediate housing 143 and the leakage piston 155 as a fluid inlet connection 147 into a pilot chamber 163. Furthermore, the intermediate housing 143 has tapered cross sections in the transverse bores 161 to form pilot orifices 164 (FIGS. 5, 6). A reset spring 165 acts on the leakage piston 155 on the end side and is held in a recess 167 of a screw 169 provided on the end side on the intermediate housing 143. The screw 169 is a retainer and has a bore 171 for passage of fluids in the pilot chamber 163. On the end 173 opposite the reset spring 165, the leakage piston 155 is tapered and has an actuating piece 175 in contact with the valve closing element 151. When the valve closing element 151 is in its open position OS, a fluid drain channel 177 is established via transverse bores 179 in the leakage piston 143 between the pilot chamber 163 and the drain port 123.

For the purpose of sealing, the main valve piston 125 and the leakage piston 155 have pressure centering grooves 180 that are circumferential on the peripheral side.

The valve 117 is controlled by an electromagnetic actuating apparatus 149. The actuating apparatus 149 has a magnet armature 181 whose armature space 183 is balanced by pressure relief bores 185 relative to the drain port 123. The magnet armature 181 is arranged to be able to move lengthwise in a pressure sleeve 187 and acts on the valve closing element 151 via a rod-shaped actuating part 189. The pressure sleeve 187 has a recessed bottom 191 that acts as a stop 193 for the magnet armature 181. The pressure sleeve 187 is placed onto the pole core 195 and is sealed in a peripheral groove 199 of the pole core 195 via an O-ring seal 197. On the outside, a coil body 201 with wound coil turns 203, which coil turns are protected against the exterior by a sleeve 205 is pushed onto the pressure sleeve 187. The sleeve 205 is crimped to the pole core 195 and a closure part 207 and is sealed by O-ring seals 209. On the end side, the actuating apparatus 149 has a plug-and-socket connection 211 for coupling to a control unit. On the pole core 195, an annular flange part 213 mounts the valve 117 on a valve block.

In these two embodiments of the valve 1, 117 according to the invention, underneath the valve seat 47, 153 of the pilot stage 13, 141, a leakage reduction stage 53, 157 connects the pilot chamber 41, 163 alternately or with sliding transitions to the pressure supply port 7, 119 or the drain port 11, 123. The leakage of the pilot oil, in particular in the neutral position of the conventional valves drains unused to the drain port 11, 123 can be minimized. This minimizing of the leakage reduces the power loss of the valve 1, 117 and a possible cycle time of a hydraulic accumulator connected upstream. Therefore, the valve 1, 177 according to the invention is characterized by high energy efficiency.

While various embodiments have been chosen to illustrate the invention, it will become understood by those skilled in the art that various changes and modifications can be made therein without departing from the scope of the invention as defined in the appended claims.

What is claimed is:

1. A pilot-operated proportional pressure control valve, comprising:
 a valve housing having a pressure supply port, a working port and a drain port;
 a main valve piston movable in said valve housing and controlling fluid flow from said pressure supply port into said working port by controlling fluid communication between said pressure supply port and said working port;

a pilot stage operatively coupled to said main piston to move said main piston in said valve housing, said pilot stage having a valve closing element movable between open and closed positions;

a pilot chamber being opened and closed by said valve closing element;

an actuating apparatus coupled to and moving said valve closing element between the open and closed positions;

a leakage reduction stage being in the pilot stage and having a leakage piston coupled to and actuatable by said valve closing element to control fluid flow from said pressure supply port into said pilot chamber, with said pressure supply port being in fluid communication with said pilot chamber with said leakage piston being in an open position of said leakage piston; and a reset spring being at an end of said leakage piston remote from said actuating apparatus and biasing said leakage piston toward said actuating apparatus.

2. A pilot-operated proportional pressure control valve according to claim 1, wherein
said valve closing element and said leakage piston are fixedly connected to one another.

3. A pilot-operated proportional pressure control valve according to claim 1 wherein
said leakage piston forms a fluid inlet connection fluidly connecting said pressure supply port and said pilot chamber only in the closed position of said valve closing element.

4. A pilot-operated proportional pressure control valve according to claim 1 wherein
said leakage piston comprises a fluid drain channel to convey fluid from said pilot chamber to said drain port.

5. A pilot-operated proportional pressure control valve according to claim 1 wherein
said leakage reduction stage is located in said valve housing between said valve closing element and said main valve piston.

6. A pilot-operated proportional pressure control valve according to claim 1 wherein
said leakage reduction stage is located in an intermediate housing.

7. A pilot-operated proportional pressure control valve according to claim 6 wherein
said intermediate housing comprises an axial bore receiving said leakage piston and said reset spring.

8. A pilot-operated proportional pressure control valve according to claim 7 wherein
a retainer is on an end side of said intermediate housing.

9. A pilot-operated proportional pressure control valve according to claim 8 wherein
said retainer comprises a screw with a fluid channel.

10. A pilot-operated proportional pressure control valve according to claim 8 wherein
said reset spring contacts one end surface of said retainer.

11. A pilot-operated proportional pressure control valve according to claim 8 wherein
said reset spring is received in a recess in said retainer.

12. A pilot-operated proportional pressure control valve according to claim 7 wherein
a fluid inlet connection is openable between at least one transverse bore in said intermediate housing and an axial bore in said leakage piston.

13. A pilot-operated proportional pressure control valve according to claim 7 wherein
a retainer is on an end side of said intermediate housing remote from said actuating apparatus.

14. A pilot-operated proportional pressure control valve according to claim 13 wherein
said reset spring contacts one end surface of said retainer and said end of said leakage piston, and is entirely in said axial bore.

15. A pilot-operated proportional pressure control valve according to claim 6 wherein
a throttle is in fluid communication with and is between said pressure supply port and said leakage reduction stage.

16. A pilot-operated proportional pressure control valve according to claim 15 wherein
said throttle is formed by an annular gap between a valve housing part and said intermediate housing.

* * * * *